(12) United States Patent
Posadas Mañanes

(10) Patent No.: US 11,008,472 B2
(45) Date of Patent: May 18, 2021

(54) FORMULATION OF THINNERS FOR WATERBORNE PAINTS WITH LOW VOLATILE ORGANIC COMPOUND LEVELS

(71) Applicants: Sinforiano José Posadas Mañanes, Malaga (ES); Omar Martinez Castro, Aldaya (ES)

(72) Inventor: Sinforiano José Posadas Mañanes, Malaga (ES)

(73) Assignees: Sinforiano José Posadas Mañanes, Malaga (ES); Omar Martinez Castro, Aldaya (ES)

( * ) Notice: Subject to any disclaimer, the term of this patent is extended or adjusted under 35 U.S.C. 154(b) by 288 days.

(21) Appl. No.: 16/324,600

(22) PCT Filed: Aug. 12, 2016

(86) PCT No.: PCT/IB2016/054855
§ 371 (c)(1),
(2) Date: Feb. 11, 2019

(87) PCT Pub. No.: WO2018/029512
PCT Pub. Date: Feb. 15, 2018

(65) Prior Publication Data
US 2019/0177557 A1 Jun. 13, 2019

(51) Int. Cl.
*C09D 7/20* (2018.01)
*C09D 7/00* (2018.01)
*C09D 5/00* (2006.01)

(52) U.S. Cl.
CPC ............. *C09D 7/20* (2018.01); *C09D 5/00* (2013.01); *C09D 7/00* (2013.01)

(58) Field of Classification Search
None
See application file for complete search history.

(56) References Cited

U.S. PATENT DOCUMENTS

| | | | |
|---|---|---|---|
| 10,413,769 B2* | 9/2019 | McDaniel | C09D 5/34 |
| 2010/0279912 A1 | 11/2010 | Bortz | |
| 2012/0135243 A1* | 5/2012 | Onoe et al. | C08F 255/00 428/413 |
| 2014/0193889 A1* | 7/2014 | McDaniel | C09D 5/00 435/264 |
| 2014/0311384 A1 | 10/2014 | Ledford et al. | |
| 2015/0191607 A1* | 7/2015 | McDaniel | C09D 7/48 424/409 |
| 2015/0259570 A1* | 9/2015 | Matsuoka | C09D 183/08 524/588 |
| 2015/0328490 A1* | 11/2015 | McDaniel | C09D 5/34 106/18.32 |

FOREIGN PATENT DOCUMENTS

| | | |
|---|---|---|
| CN | 1443812 A | 9/2003 |
| EP | 1947149 A1 | 7/2008 |
| WO | 00/71664 A1 | 11/2000 |
| WO | 2012/026985 A2 | 3/2012 |

* cited by examiner

*Primary Examiner* — Joseph D Anthony
(74) *Attorney, Agent, or Firm* — Richard M. Goldberg

(57) ABSTRACT

A formulation of thinners for waterborne automotive paints with low volatile organic compound levels, that include components able to be diluted in water, including a composition of a benzene derivative; a combination of two alcohols of a methyl alcohol and an isopropyl alcohol; an ester; osmotized water; and a ketone, where the benzene derivative is a toluene, a xylene, or a mixture of both; and wherein the composition is formed by the following compounds (in weight): Toluene/xylene from 1% to 9.5%; Isopropyl Alcohol from 30% to 45%; Methyl Alcohol from 1.5% to 12%; Methyl Acetate from 0.4% to 3%; Dimethyl Ketone from 0.78% to 6.3%; and Water from 30% to 66%, with the thinner compound mixed with waterborne paint having a low roughness, an improved gloss and particle size distribution (PSD) and a drying time between ½ and ¼ of the drying time without this thinner.

14 Claims, No Drawings

FORMULATION OF THINNERS FOR WATERBORNE PAINTS WITH LOW VOLATILE ORGANIC COMPOUND LEVELS

BACKGROUND OF THE INVENTION

The technical sector involved in this invention is that of waterborne paints, these being the sort that form an opaque base which is intended to cover a surface evenly in very fine coats, applied by spraying, or in some cases by means of direct application with a brush, fine brush, roller or similar.

STATEMENT OF THE PRIOR STATE OF THE ART

The paints used until last decade were the so called acrylic type, mainly in the automobile sector but also in other sectors such as aeronautic refinish. These paints had the disadvantage of only dissolving or being dissolved in acrylic solvents. These paints are later applied a layer of gloss varnish. However, the use of acrylic paints has given way to the use of water paints, which are the ones which are diluted in a water base.

With the new rules regulating the use of VOC (Volatile Organic Compounds) in spray paint now in effect, auto-body shop operators are forced to quickly convert theft installations from using traditional solvent-based paints to newer water-based ones. While this is a bit of a hardship on many paint shop operations, there are a number of advantages the new coatings offer that should help small businesses justify the cost of making the transition. Ready-to-use conventional base-coats have a VOC solvent content of around 84% (and 16% solids), whereas a typical waterborne base-coat is composed of about 70% water (and 20% solids) and 10% solvent. So the reduction in solvent use in making the switchover is substantial.

Some are the advantages waterborne paints have in comparison with acrylic solvent type:
1. Better for the environment: Less toxic paint is important, elevated concentrations can persist in the air long after painting or repainting is completed, according to the Environmental Protection Agencies.
2. Healthier for the workers: Waterborne paint reduces the emission of VOC, i.e. the toxic emanations with respect to acrylic paints, thus improving air quality and reducing the health risk to everyone involved (Exposure to Solvent fumes can impair cognitive ability long after retirement).
3. Less clearcoat needed: For multiple hues and striping, waterborne paint has an advantage when it comes to spraying due to a thinner application. It takes less clearcoat to even out the surface for the different layers.
4. Cleaner/brighter than solvent-based paint: In painting with waterborne paint, wet paint tends to have a different hue from the true color. Once it dries, the waterborne paint will take on the true hue. Interestingly, when it comes to the actual color with waterborne, it comes out cleaner/brighter than a solvent-based paint.
5. Fire safety: the fire safety is also higher with the use of water paints; the flashpoint in acrylic paints is lower due to the volatile components. Also the amount of inflammable material in the acrylic paints is higher than in the water paints; the result is that for a same amount of paint, there is at least twice higher the amount of volatile inflammable compounds and these compounds are inflammable at a lower temperature; for a standard environmental temperature, the danger of fire is many times higher using acrylic paints than with the use of water paints;
6. Safer installations: the facilities have lower fire risk by using water paints than using acrylic paints; water paints are not as combustible as the acrylic ones previously used.

Nevertheless the problem with these paints, doubtlessly more ecological and free of the problems involved with acrylic paints, consists in the fact that: Water paints require less spray gun pressure than acrylic ones, notwithstanding both undergo great dispersion, blow off with air and have to be applied with high gun pressures for acrylic paint, and average pressure for water paint, to obtain an appropriate and even dispersion. The working distance thus depends on the gun spraying pressure and is in any event greater than when the thinner hereby disclosed is used. Hence, the greater distance the lower accuracy in the application of paint. Apart from this there is a matter of price. Through the fact of being required for use, or due to paying off a new technology, these water paints have clearly higher prices than traditional ones. Actually, the thinner for these paints may reach 10% of their volume, meaning that for each liter of waterborne paint, 1.1 liters of applicable paint are obtained. If more solvent rate is used the paint is dispersed and loses its properties derived from the particle size distribution (PSD), i.e. gloss/flatting and film appearance, roughness, flocculation, hue/tint strength, hiding/transparency, viscosity, stability, and weather resistance. Apart from this, and particularly in the matter of repairs, the paint does not have features comparable to the previous acrylic sort. Once dry the acrylic ones could be very effectively sandpapered. Water paints do not allow this workability, which means that always is required the whole part to be painted.

Another problem is that the drying time of water paints is higher than of acrylic paints, as a situation which enlarges the use of the paint booth, thus making the booth use more expensive as water paints take approximately five times longer to dry than acrylic paints.

Up to now, the water paint cost is also higher than the acrylic ones, thus making the use of water paints less attractive than traditional acrylic paints.

One additional problem is that the pH of the composition must be in an optimum level of 7-8.5 but the solvents are mainly acid and tend to reduce the pH value. If the pH is out of the optimum range one or more paint properties are lost, and the result is not that desired.

With the thinner of the invention, it will be possible restoring small bumps on a vehicle with no need to paint the whole part, also correcting any possible irregularities which might stem from applying the paint on small areas of sheet metal, since water paint is not eliminated when sandpaper treatment is applied. Actually, current water paints, 10% dissolved, entail the problem that when sandpapering is applied the whole coat of paint is eliminated. Hence water paint technique requires perfection in repairs, which is not always possible in every job, both if working in part areas where is difficult to access, or involving curves or volumes which receive more paint in certain zones than others.

SUMMARY OF THE INVENTION

It is aimed with this invention providing a thinner for water paints which solve the problems cited above.

The evolution in the paint market from acrylic to water paints has been mentioned. The pigment in the paints, the opaque mass of particles which, after being extended on the surface area in question, manages to cover this surface evenly, is formed of particles of resin, dyes and microgel. The paints mix different types of resins with the pigments, whose result is, in acrylic paints, the formation of a compound which polymerizes when it dries, so that the process cannot be made reversible. Water paints have a similar behavior, with a polymerization process through condensation stemming from the volatilization of the particles of water and hydrogen present.

EP1947149 A1 discloses a thinner for water-based paints which has the following components: A benzene derivative, particularly toluene; an alcohol, particularly methyl or ethyl alcohol; and water; it also discloses the use of methyl acetate, alkylbenzenes. It is obtained a greater particles size, and allow the use of sandpaper.

It has been seen that the composition of EP1947149 A1 has some deficiencies, which are the following:

- The level of VOC is over the limits of the corresponding legal regulations, which do not allow to be used in the industry or workshops;
- It has been checked that the mixture of the different compounds as defined in the application do not allow obtaining a homogenous phase; the use of it produces adverse unexpected results, lack of solubility with water, VOC in excess, drying time long, unsatisfactory PSD and roughness;
- As bigger the particle size, lower the quality of the painted surface, in the roughness, brightness, etc. . . .
- It has been checked that is not possible to combine more than 0.5 times the quantity of base paint to obtain a reasonable result (with the other cited inconveniences); the use of a 500% as defined is phantasy.

There is no known thinner whose features are similar to those defined in this invention.

In particular, the known water paint thinners only allow to dilute the paint in a rate of 1:0.10 (one part of paint 0.10 parts of thinner) thus obtaining a 1.10 ready to use paint.

Polymers used water painting, particularly in the metal painting and more particularly in automobile industry, tend to be present in a compartmentalized way. When a conventional thinner is used in a greater amount than that recommended by the manufacturer, there will result the adverse effects above detailed.

It is desirable and an object of this invention, to provide a thinner that can be effectively used in a rate of or near to 1:1 with respect to the paint keeping or improving all the properties of the original paint with other thinners, thus lowering the costs, allowing to be sprayed at a lower pressure, at a shorter distance, and with a drying time similar to that of the acrylic paints, and with lower VOC, also improving the atomization and PSD with which performance and productivity are improved, With the proposed invention, it is possible to increase the performance of the same base paint. Using the thinner of the invention can be obtained up to twice the quantity of the base paint, even more, whilst in the prior art thinners there can only be obtained a 1.10 times the base paint (an increase of a 10%).

It has been checked that the diluted paint also has a very homogeneous size of sprayed particles (PSD); because of the relationship between the PSD and the roughness, a lower roughness is thus obtained, so less amount of paint (base paint and also ready to use paint) is required, to get a optimal finishing. Furthermore, the amount of volatile compounds is minimum, and is below the limits stated in the legal regulations.

Also with the thinner of the invention the optimum pH of the composition is kept within the correct work parameters, whilst the solubility of the water-toluene by means of the other compounds is maintained or improved.

DETAILED DESCRIPTION OF THE INVENTION

According to the invention a thinner is disclosed which is formed by the following compounds:

- a benzene derivative, being said benzene derivative a toluene, a xylene or a mixture of both;
- a combination of two alcohols, being said alcohols methyl alcohol and isopropyl alcohol;
- a ketone, particularly dimethyl ketone, methyl-ethyl ketone or a combination of both;
- an ester, being said ester a methyl acetate, ethyl acetate, or a combination of both;
- water, particularly osmotized water.

The composition can also include:

- an ethanol amine, being said ethanol amine trietha-nolamine (TRIS);
- a weak acid, namely acetic acid or boric acid;
- a chelating agent; namely EDTA (Ethylenediaminetet-raacetic acid); and or
- a sulfoxide, namely dimethyl sulfoxide Particularly the composition has the following ranges (in weight):

Toluene/xylene from 1% to 9.5%;
Isopropyl Alcohol from 30% to 45%
Methyl Alcohol from 1.5% to 12%
Methyl Acetate from 0.4% to 3%
Dimethyl Ketone from 0.78% to 6.3%
Water from 30% to 66%

More particularly, the composition has the following ranges (in weight)

Toluene/xilene from 2% to 6%
Isopropyl Alcohol from 30% to 40%
Methyl Alcohol from 3.5% to 5%
Methyl Acetate from 1.5% to 3%
Dimethyl Ketone from 3% to 4%
Water from 38% to 52%

Depending on the particular composition within the ranges detailed above, it has also one or more of the following compounds in the following ranges:

TRIS (Hidroximethyl aminomethane) up to 5.4%
One of:
　Boric Acid up to 3%,
　Acetic Acid up to 0.7%
Ethylenediaminetetraacetic acid up to 3.5%
Dimethyl Sulfoxide up to 12%, particularly between 3.5% and 6%)

It can be seen that the composition above detailed has some compound in common with EP1947149, and in particular includes the following compounds:

a benzene derivative, particularly toluene
the use of methyl alcohol
an ester, such as methyl acetate
and osmotized water It is seen that the ranges of most compounds involved in the thinner composition are specified in different ranges as in EP1947149. The use of a ketone has been demonstrated to be critical to obtain the desired result; it increases the solubility of the other compounds in water, and helps to solve the problems stated above.

It has been verified that EP do not solve the problems of solubility nor meet the VOC required levels. With the proposed composition both features are substantially improved.

The following results are obtained

A better miscibility with the base paint (and with the water rates in the base paint)

Lower particle size when the base paint is mixed with the thinner

A better and more homogenous particle distribution, and particle size stability

Less VOC, <420 g/l.

And as a result of it the following have been obtained:

More regular distribution of pigments

Lower roughness once the paint is dried;

Less pigments needed, and therefore less base paint use required

Because of the lower roughness, also less clearcoat is required

Toluene is used as a common dissolvent in paints, also in water paints. Toluene is highly volatile and is also toxic; furthermore, the polar moment of toluene is low (0,43 D). Therefore, it is not advisable to use toluene itself without other elements which limit or reduce significantly its volatility. For this end the amount of toluene has been reduced.

Since the miscibility of toluene in water is null, it was necessary to add other compounds which help to mix toluene and water. This was obtained satisfactorily with the proposed, and also has been verified that the final solution particle distribution is homogenous. The use of very polar protic and non protic compounds (alcohols, ketones, sulfoxides) increases the ionic force in the final solution and has been demonstrated to be suitable for the purposes of this invention.

On the other hand, isopropyl alcohol, methyl alcohol, ketone and dimethyl sulfoxide are each of common use as solvents and chemical intermediate in acrylic paints, resins, and others, but not in water paints. The use of each of them separately as solvent for water paints, even as described in the prior art documents, do not give the result according to the requirements above detailed, which is obtained with the proposed composition.

Alcohols are good solvents which also contribute to mix toluene and water, and the ester low solubility.

With the proposed composition it has been verified that VOC are drastically reduced.

To have pH values in which the composition gives an optimum performance of the paint, avoiding loss of the paint properties during preparation, application and along the time, pH regulators are used. These pH regulators must also act as solvent in the composition and must be compatible with the other compounds. For this, TRIS has been used to increase the pH values when they are low in excess, and acetic acid or boric acid are used to balance the resulting pH value when required.

Finally, EDTA can be used to stabilize the cations in the composition because it has been demonstrated its capability to act as a cation stabilizer in transition metals present in the composition, such as titanium oxides pigments.

The proportions above detailed are relevant for obtaining a paint substrate with a composition such that fast-drying coats with the same pigmentation are formed.

The solution put forward by this invention provides a valid response to the different problems stated. On the one hand, it produces the effect of maximizing the paint yield, in order that:

It can be mixed up to 150% in the thinner, which, far from being expensive, minimizes the price effect that paint can have, in spite of having a price higher than other acrylic types.

High waterborne paint performance because of their low roughness and a uniform size distribution of particles (PSD). This also minimizes the price because less amount of paint is required to get an excellent performance. In addition formulations can be used as antifouling additive because of their roughness properties.

The drying time is short, similar to acrylic paints; at least one half and to one fourth than with water paints not treated with this thinner, and the paint has been totally dried in the booth in approximately seven minutes, being able to be sanded without losing any of the conditions of the paint, and prior to the application of the coat of gloss that these water paints require.

In most formulations waterborne automotive paint compositions having a low organic compound (VOC) rating which permit its use for cleaning and thinning in government regulating areas.

It is not dispersed when this is applied, as this practically fails to volatilize, generating less pollution, because the mixture obtained has greater relative weight than the acrylic sort, given the greater size of each particle projected out.

The paint only reaches the area that is required to be painted.

The compressed air pressure is considerably lower than in the other paints.

Sandpaper can be used to sand it, meaning that once the paint is dry, the surface can be rectified without losing its quality, the base paint applied setting better into the surface on which it is applied than any of the water paints available. For this reason it stands up to treatment with sandpaper.

These thinner formulations do not deteriorate with sandpaper treatment.

Finally, the embodiments were evaluated the performance of the additive (thinner) following these tests which are applied in waterborne paints: Neutral salt spray test (EN ISO 9227), Flexibility/mandrel bending test (EN ISO 1519), Water immersion test (EN ISO 2812), Pull-off adhesion (EN ISO 4624) and Cross-cut test (EN ISO 2409), VOC Test (EN ISO 11890). The results indicate that our formulations don't modify these physical and chemical properties and the embodiments have a good performance on this concern.

EXAMPLES OF PARTICULAR EMBODIMENTS, DRYING TIMES AND ROUGHNESS

In tables I different formulations mixed 1:1 with different waterborne paint brands are shown.

TABLE I

Formulations of thinner

| Thinner Compound | Sample1 Weight Percentage | Sample2 Weight Percentage | Sample 3 Weight Percentage | Sample 4 Weight Percentage |
| --- | --- | --- | --- | --- |
| Osmotized Water | 38.1 | 38.1 | 35 | 40 |
| Toluene | 5.7 | 5.7 | 6.8 | 5.6 |
| Isopropyl Alcohol | 41 | 41 | 33.6 | 32.60 |
| Methyl Alcohol | 4.5 | 4.5 | 5.5 | 4.60 |
| Methyl Acetate | 1.4 | 1.4 | 1.75 | 1.4 |
| Dimethyl Ketone | 3.6 | 3.6 | 4.35 | 3.64 |

TABLE I-continued

Formulations of thinner

| | | | | |
|---|---|---|---|---|
| Tris (hydroxymethyl) aminomethane | 2.7 | 2.7 | 2.7 | 2.74 |
| EDTA | 1.5 | 2.30 | 1.5 | 1.84 |
| Boric Acid | 1.5 | 0 | 0 | 1.58 |
| Acetic Acid | 0 | 0.7 | 0.3 | |
| DMSO | 0 | 0 | 8.5 | 6 |

| Thinner Compound | Sample 5 Weight Percentage | Sample 6 Weight Percentage | Sample 7 Weight Percentage | Sample 8 Weight Percentage |
|---|---|---|---|---|
| Osmotized Water | 42 | 43.45 | 48.12 | 47.5 |
| Toluene | 4 | 2.1 | 2.70 | 4.1 |
| Isopropyl Alcohol | 32 | 33.8 | 38.25 | 32.9 |
| Methyl Alcohol | 4.4 | 3.96 | 4.93 | 4.4 |
| Methyl Acetate | 1.8 | 1.63 | 2.04 | 1.6 |
| Dimethyl Ketone | 3.5 | 3.16 | 3.96 | 3.5 |
| TRIS (hydroxymethyl) aminamethane | 5 | 5.4 | 0 | 0 |
| EDTA | 3 | 3.5 | 0 | 0 |
| Boric Acid | | 3 | 0 | 0 |
| Acetic Acid | 0.6 | 0 | 0 | 0 |
| DMSO | 3.7 | 0 | 0 | 6 |

The mixture of these with the paint makes this disperse and creates the possibility of producing drying in one half and up to one fourth of the time without the proposed composition, with a polymerization effect of its components, which can consequently be treated after drying with a water paper for going over the finished surfaces before applying the coat of lacquer which gives the gloss to the automobile body.

To test drying times, we mixed the different formulations with waterborne brands, and thus measurements were performed in properly primed steel plates with thermodynamic conditions of 25 C.° and 50% of humidity in a booth where the plates were duly labeled with covering control paper to ensure the same amount a waterborne thinner mix in each plate.

In table IV we show the drying times of the different formulations mixed with waterborne automotive brands.

TABLE II

Drying times. Times are showed in minutes and seconds.

| Thinner Formulation | PPG | NEXA | Glasurit | Cromax-Pro |
|---|---|---|---|---|
| None (10% water) | 25:36 | 26:12 | 28:10 | 25:42 |
| Sample 1 | 9:24 | 9:39 | 10:38 | 9:30 |
| Sample 2 | 10:30 | 10:45 | 11:30 | 10:38 |
| Sample 3 | 12:40 | 13:10 | 14:03 | 12:55 |
| Sample 4 | 11:05 | 11:05 | 11:05 | 11:05 |
| Sample 5 | 8:50 | 9:27 | 9:50 | 8:56 |
| Sample 6 | 7:16 | 7:30 | 8:01 | 7:22 |
| Sample 7 | 6:50 | 7:04 | 7:34 | 7:01 |
| Sample 8 | 8:33 | 9:10 | 9:30 | 8:45 |

The results indicate that drying times are lower compared with a sample without our thinner formulations and ranging from one half to one fourth.

Finally we determined roughness in some samples by Atomic Force Microscopy. For this purpose, we analyzed samples 1, 2, 3, 6, 7 and 8. We prepare plates with different samples thinner+waterborne paint as above.

In table III the results expressed as root mean square average of height deviations taken from the mean image data plane, called Rq, are shown:

$$R_q = \sqrt{\frac{\sum (Z_i)^2}{N}}$$

where Zi is height

TABLE III

Analysis of Roughness by Atomic Force Microscopy (AFM). Results are shown as Rq.

| | Rq values for different samples + waterborne paint | | | |
|---|---|---|---|---|
| Area μm² | None | Sample 1 | Sample 2 | Sample 3 |
| 25 | 13.7 | 10.22 | 9.47 | 9.19 |
| 100 | 42.7 | 19.30 | 19.6 | 15.4 |
| 400 | 87.4 | 30.29 | 41.9 | 24.1 |

| | Rq values for different samples + waterborne paint | | | |
|---|---|---|---|---|
| Area μm2 | None | Sample 6 | Sample 7 | Sample 8 |
| 25 | 13.7 | 5.70 | 10.9 | 3.34 |
| 100 | 42.7 | 19.69 | 25.6 | 13.3 |
| 400 | 87.4 | 46.67 | 44.6 | 44.6 |

From the assays made it can be stated that the effect of the thinner result in the formation of a new phase formed by the paint and the thinner so that the particles of paint are reinforced without losing any chromatic richness, given greater weight, and a shorter drying time is achieved through combining these, at least two and a half times lower than the same water paint without being treated with this thinner. Hence the paint particles treated with the thinner prior to its application take on a better atomization and PSD as compared with the water paints not treated with this thinner, and have greater weight than the air, without being volatile.

This is for industrial application in making thinners, reactive, activators, antifouling for water paints.

What is claimed is:

1. A formulation of thinners for waterborne paints with low volatile organic compound levels, of the sort that consist of components able to be diluted in water, comprising a composition of: a benzene derivative; a combination of two alcohols of a methyl alcohol and an isopropyl alcohol; an ester; osmotized water; and a ketone; where the benzene derivative is selected from the group consisting of a toluene, a xylene, and a mixture of both; wherein the composition is formed by the following compounds (in weight):

Toluene/xylene from 1% to 9.5%;

isopropyl Alcohol from 30% to 45%;

Methyl Alcohol from 1.5% to 12%;

Methyl Acetate from 0.4% to 0.3%;

Dimethyl Ketone from 0.78% to 6.3%; and

Water from 30% to 66%.

2. A formulation of thinners for waterborne paints with low volatile organic compound levels, according to claim 1, wherein the composition is formed by the following compounds (in weight):

Toluene/xylene from 2% to 6%;

Isopropyl Alcohol from 30% to 40%;

Methyl Alcohol from 3.5% to 5%;

Methyl Acetate from 1.5% to 3%;

Dimethyl Ketone from 3% to 4%; and

Water from 38% to 52%.

3. A formulation of thinners for waterborne paints with low volatile organic compound levels, according to claim 1, wherein the composition also includes an ethanol amine up to a 5.4% in weight.

4. A formulation of thinners for waterborne paints with low volatile organic compound levels, according to claim 1, wherein the composition also includes a weak acid.

5. A formulation of thinners for waterborne paints with low volatile organic compound levels, according to claim 1, wherein the composition also includes a chelating agent.

6. A formulation of thinners for waterborne paints with low volatile organic compound levels, according to claim 1, wherein the composition also includes a sulfoxide.

7. A formulation of thinners for waterborne paints with low volatile organic compound levels, according to claim 1, wherein after applying said thinner to a paint, the paint has a homogeneous particle size distribution (PSD) and a lower roughness than paint applied without the thinner.

8. A formulation of thinners for waterborne paints with low volatile organic compound levels, according to claim 1, wherein paint applied with said thinner has an organic compound (VOC) lower than 420 g/l.

9. A formulation of thinners for waterborne paints with low volatile organic compound levels, according to claim 1, wherein paint applied with said thinner stands up to treatment with sand paper.

10. A formulation of thinners for waterborne paints with low volatile organic compound levels, according to claim 1, wherein paint applied with said thinner has a drying time between one half and one fourth than without application of the thinner.

11. A formulation of thinners for waterborne paints with low volatile organic compound levels, according to claim 3, wherein said ethanol amine is ethanol amine triethanolamine (TRIS).

12. A formulation of thinners for waterborne paints with low volatile organic compound levels, according to claim 4, wherein the weak acid is selected from the group consisting of acetic acid up to 0.7% in weight and boric acid up to 3% in weight.

13. A formulation of thinners for waterborne paints with low volatile organic compound levels, according to claim 5, wherein the chelating agent is EDTA (Ethylenediaminetetraacetic acid) up to 3.5% in weight.

14. A formulation of thinners for waterborne paints with low volatile organic compound levels, according to claim 6, wherein the sulfoxide is a dimethyl sulfoxide up to 12% in weight.

* * * * *